US008720263B2

(12) United States Patent
Koch et al.

(10) Patent No.: US 8,720,263 B2
(45) Date of Patent: May 13, 2014

(54) MEASUREMENT DEVICE FOR CARRYING OUT A BRAKE TEST IN A RAIL VEHICLE

(75) Inventors: Jörg Koch, Munich (DE); Sven Osbahr, Freising (DE); Marc-Oliver Herden, Munich (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 13/634,136

(22) PCT Filed: Mar. 10, 2011

(86) PCT No.: PCT/EP2011/053636
§ 371 (c)(1),
(2), (4) Date: Feb. 8, 2013

(87) PCT Pub. No.: WO2011/110638
PCT Pub. Date: Sep. 15, 2011

(65) Prior Publication Data
US 2013/0125637 A1 May 23, 2013

(30) Foreign Application Priority Data
Mar. 12, 2010 (DE) .......................... 10 2010 011 352

(51) Int. Cl.
*B60T 17/22* (2006.01)
(52) U.S. Cl.
USPC .......................................................... 73/121
(58) Field of Classification Search
USPC .......................................................... 73/121
See application file for complete search history.

(56) References Cited

U.S. PATENT DOCUMENTS

| 5,201,834 A | 4/1993 | Grazioli et al. |
| 6,227,625 B1 | 5/2001 | Gaughan |

(Continued)

FOREIGN PATENT DOCUMENTS

| DE | 9311524 U1 | 10/1993 |
| DE | 202006015627 U1 | 2/2007 |
| EP | 0391047 A1 | 10/1990 |
| EP | 1729104 A1 | 12/2006 |

OTHER PUBLICATIONS

Notification Concerning Transmittal of International Preliminary Report on Patentability and Written Opinion of the International Search Authority for International Patent Application No. PCT/EP2011/053636, dated Mar. 10, 2011 and the English Translation.

(Continued)

*Primary Examiner* — Freddie Kirkland, III
(74) *Attorney, Agent, or Firm* — Barnes & Thornburg LLP

(57) ABSTRACT

A mobile measurement device for carrying out a brake test in a rail vehicle, in particular having a pneumatic brake system on which are formed externally accessible measurement ports for pressure sensors whose electric measurement signal is processed by a mobile electronic measurement unit which is connected to the sensors locally thereto, which measurement unit is provided with an input for control and with a display for a user dialog and for displaying measurement results, wherein the input and the display for the electronic measurement unit are arranged in a portable control end unit, arranged separately from the electronic measurement unit, for remote control and for storable outputting of measurement results, wherein the electronic measurement unit and the control end unit communicate bidirectionally with one another via a respectively associated radio interface.

11 Claims, 1 Drawing Sheet

(56) References Cited

U.S. PATENT DOCUMENTS

| | | | |
|---|---|---|---|
| 6,375,276 B1 * | 4/2002 | Delaruelle | 303/7 |
| 6,446,490 B1 * | 9/2002 | Lohner et al. | 73/39 |
| 6,837,550 B2 * | 1/2005 | Dougherty et al. | 303/3 |
| 8,386,122 B1 * | 2/2013 | Collins | 701/31.1 |
| 2006/0074581 A1 | 4/2006 | Crane et al. | |
| 2007/0247000 A1 | 10/2007 | Fugiel et al. | |

OTHER PUBLICATIONS

German Office Action of Application No. 10 2010 011 352.2, dated Aug. 14, 2012.
Search Report for German Patent Application No. 10 2010 011 352.2; Aug. 2, 2010.
Search Report for International Patent Application No. PCT/EP2011/053636; Oct. 24, 2011.

* cited by examiner

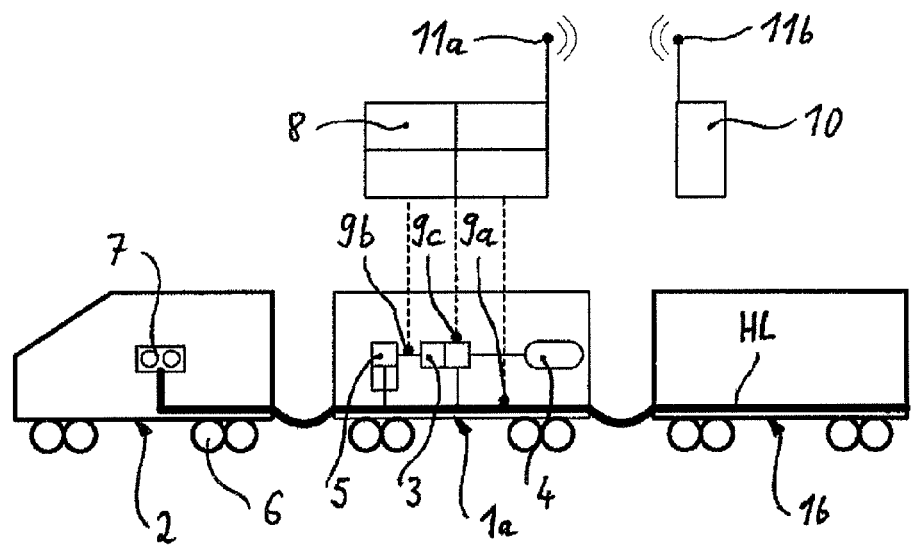
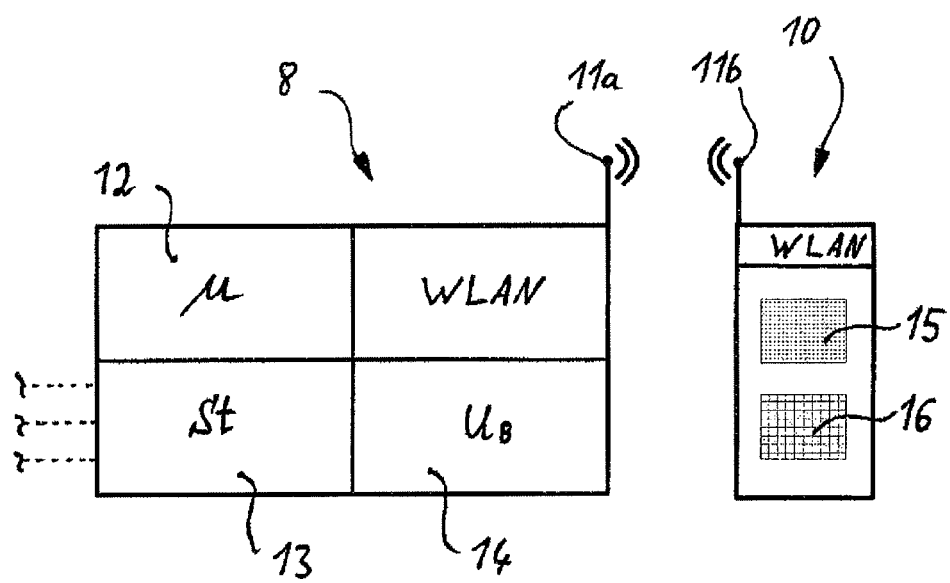
Fig.1
Fig.2  Fig.3

MEASUREMENT DEVICE FOR CARRYING OUT A BRAKE TEST IN A RAIL VEHICLE

PRIORITY CLAIM

This patent application is a U.S. National Phase of International Patent Application No. PCT/EP2011/053636, filed Mar. 10, 2011, which claims priority to German Patent Application No. 10 2010 011 352.2, filed Mar. 12, 2010, the disclosures of which are incorporated herein by reference in their entirety.

FIELD

Disclosed embodiments relate to a mobile measurement device for carrying out a brake test in a rail vehicle, having a brake system to which measurement connections for pressure sensors, which measurement connections are accessible from the outside, are fitted, the electrical measurement signal from said pressure sensors being subject to signal-processing by a mobile electronic measurement unit which is connected to said sensors in the vicinity thereof and which is equipped with input means for operator control and with display means for user dialog and also for displaying measurement results.

BACKGROUND

Disclosed embodiments relate to a rail vehicle to which a mobile measurement device of the above-described kind is connected.

According to currently applicable regulations of the International Union of Railways (UIC), the German Federal Regulation on Light Rail Systems and Metros (BoStrab) and the Association of American Rail Roads (AAR), specific brake tests, with respective regional emphasis, for a pneumatic brake system of the type of interest here are required to diagnose the correct brake function of a rail vehicle. The functional state of a pneumatic brake system can be controlled on the basis of the measurement values obtained by the brake test. This ensures the safety of the brake system and a servicing operation may be initiated as a result. In this case, conclusions can also be drawn about the compressed-air device to be serviced, for example the brake control device, and the faults therein by analyzing the measurement results obtained. To achieve comparable measurement results, the brake tests are usually standardized in respect of the measurement values which are to be obtained, the test pressures and other parameters.

The general prior art discloses a measurement device which is intended for mobile use to be able to transport the measurement device easily to the rail vehicle which is to be tested. In this case, the measurement device is constructed on a carriage or in a mobile carrying device which, in addition to a computer which is in the form of a PC with a keyboard and a screen as input and, respectively, output means, also has the required measurement interfaces for connection of the pressure sensors and the like.

However, the mobility of a measurement device of this kind is restricted since the design of the carriage is quite bulky and therefore, in particular, use of said mobile measurement device outside the workshop is not possible. In addition, although mobile measurement devices for carrying out a brake test are known, said mobile measurement device being accommodated in a portable case, the quite heavy measurement components are integrated on either side of the two shells of a case of this kind and subject the case hinges to loading which is so severe that said hinges usually break in the medium term, and therefore this known mobile solution is not particularly practical and, in particular, is not suitable for rough use outdoors where it is subject to extreme temperature fluctuations.

SUMMARY

Disclosed embodiments, therefore, provide a mobile measurement device for carrying out a brake test, which mobile measurement device is distinguished by a high degree of mechanical stability together with a high degree of mobility at the same time.

BRIEF DESCRIPTION OF THE FIGURES

Measures which provide this utility are illustrated in greater detail below together with the description of an exemplary embodiment with reference to the figures, in which:

FIG. 1 shows a schematic side view of a rail vehicle comprising a plurality of individual carriages, FIG. 2 shows a schematic block diagram illustration of the electronic measurement unit, and FIG. 3 shows a schematic block diagram illustration of a portable control terminal.

DETAILED DESCRIPTION

Disclosed embodiments disclose the technical teaching that the input means and the display means for the electronic measurement unit are arranged separately from the electronic measurement unit, specifically in a separate portable control terminal which performs the functions of remote control and also of outputting measurement results in a manner in which they can be stored, wherein the electronic measurement unit and the separate control terminal communicate with one another in a bidirectional manner by means of a respectively associated radio interface. As an alternative to this, it is also feasible for the control terminal to communicate with the measurement unit by means of a cable.

Utility is the ability to detach the control terminal. Therefore, the measurement device can be kept close to the carriage and therefore to the object which is to be measured, specifically by short pneumatic lines or short sensor cabling means, to avoid interference variables, while the operator can stay either in the "warmth of the cab" or centrally in the closest building. In principle, the control terminal used can be a PC, a laptop, a PDA or a smartphone.

Utility, therefore, is that a brake test can be carried out independently of the location of the electronic measurement unit which receives the sensor signals. The wireless communication by the portable control terminal allows the operator to initiate a brake test and, while the brake test is running, to carry out a visual inspection of the activity of the brake cylinder and the like at the same time. This allows a higher degree of reliability of a brake test. Furthermore, a suitable test mode can be selected by the portable control terminal, it being possible to match the test mode exactly to the object under test by a simple selection menu on the basis of preprogrammed vehicle types, without the possibility of input errors being produced as a result. In this case, the parameters of the rail vehicle which are essential for the test are already stored in the control terminal. On account of the separate design of the control terminal, which comprises the input means and display the mobile measurement device, the electronic measurement unit, which primarily serves to receive and process the sensor signals, can be designed to be of compact construction and can be accommodated in a housing in the form of a wheeled case. A wheeled case of this kind is particularly suitable for external use and provides the electronic measurement unit with a sufficient degree of mobility.

The portable control terminal may be designed in the manner of a so-called personal digital assistant (PDA). This is because this hardware is available as a mass-produced product and the control function according to disclosed embodiments can be easily implemented by software in the PDA. The PDA should be equipped with a wireless LAN (WLAN interface) to communicate in a wireless and bidirectional manner with the electronic measurement unit. Therefore, a mass-produced product can likewise be employed for the radio interface, and therefore the mobile measurement device according to disclosed embodiments can be realized in a technically simple manner.

The portable control terminal which may be designed in this way should transmit only the control commands for the execution of a brake test by the measurement unit itself in the direction of the electronic measurement unit. This means that the brake test runs on the electronic measurement unit and also that the measurement data should be evaluated within the electronic measurement unit. The portable control terminal may optionally receive from the electronic measurement unit, the obtained measurement results which can be displayed on the control terminal or else can be stored in the control terminal, to later further process the measurement results in some other way or to archive or print out the measurement results.

At least one pressure sensor may be connected to the input end of the electronic measurement unit which is intended to be positioned close to the rail vehicle, the pressure sensor detecting the pressure in the main air line (HL), at least one further pressure sensor for detecting the associated brake pressure, and at least a third pressure sensor for detecting any control pressure in the region of the control valve or the feed pressure to the control valve. The pressure value is detected along the time axis, and therefore a corresponding signal profile over the test time is produced. In addition to the pressure values, other brake-specific measurement values can also be supplied for measurement value processing. The measurement values detected and processed depends on the brake test which is to be executed and—as explained in the introductory part—is to be carried out in accordance with the applicable regulations.

To a carry out a meaningful brake test in a rail vehicle having a plurality of brake cylinders, the pressure sensors should detect a plurality of brake pressures and/or control pressures for each associated brake cylinder or for the control valves of the brake cylinders in parallel. As a result, it is possible to check both that absolute measurement values are adhered to and also that relative differences between similar assemblies are adhered to.

The mobile electronic measurement unit, which is to be positioned close to the rail vehicle, may comprise a software-controlled microprocessor on which a measurement evaluation for implementing the brake test is run. In addition, the mobile electronic measurement unit should also comprise a rechargeable battery for the autonomous supply of operating voltage. However, in addition to or instead of this, it is also feasible to ensure the supply of operating voltage by an electrical connection line if permitted by the location of the mobile measurement device according to disclosed embodiments.

According to another measure which improves utility of the disclosed embodiments, it is proposed that the mobile electronic measurement unit is equipped with an original electronic brake pressure control means which is actually intended for a rail vehicle and to which the control valves of the rail vehicle are connected for the purpose of carrying out the brake test. The use of the original electronic brake pressure control means permits test results which are close to reality since it is designed per se to be used in the temperature range of from usually about −30° C. to 70° C., and therefore the measurement device according to the disclosed embodiments is correspondingly robust too.

According to FIG. 1, the rail vehicle comprises a plurality of carriages 1a to 1b which are pulled by a traction vehicle 2 which is in front of the carriages. Starting from the traction vehicle 2, a main air line HL is looped through from carriage 1a to carriage 1b, the main air line primarily serving to actuate a pneumatic brake system.

The pneumatic brake system comprises a control valve 3, which is connected to the main air line HL, for each carriage 1a (by way of example), the control valve, starting from a feed pressure which is stored in a container 4, switching the brake pressure for a similarly connected brake cylinder 5. The wheels 6 of the carriage 1a can be braked in a known manner by the brake cylinder 5. The feed pressure for the pneumatic brake system is provided by a compressed-air source 7, which is arranged in the traction vehicle 2, in the form of a compressor.

The pneumatic brake system is connected to a mobile electronic measurement unit 8 which is positioned close to the pneumatic brake system and is accommodated in a housing which allows mobile use as a wheeled case. A plurality of pressure sensors 9a to 9c are connected from the mobile electronic measurement unit 8. The measurement values obtained by the pressure sensors 9a to 9c are subject to signal-processing within the mobile electronic measurement unit 8, with, however, the input means and the display means for the electronic measurement unit 8 being arranged separately from the electronic measurement unit, specifically in a portable control terminal 10 which primarily serves as a remote control means and also for outputting measurement results in a manner in which they can be stored, and communicates with the electronic measurement unit 8 in a bidirectional manner by a respectively associated radio interface 11a or 11b.

From amongst the pressure sensors 9a to 9c, a first pressure sensor 9a measures the pressure in the main air line HL of the rail vehicle. At least one second pressure sensor 9b serves to measure the associated brake pressure, and a further pressure sensor 9c, which is illustrated by way of example, is provided for detecting any control pressure in the region of the control valve 3.

According to FIG. 2, the mobile electronic measurement unit 8 comprises a software-controlled microprocessor 12 in which the measurement evaluation for implementing the brake test primarily runs. In addition, the mobile electronic measurement unit 8 is equipped with a brake pressure control means 13 which is integrated in the electronic measurement unit 8 in the form of an original brake pressure control module in this case and drives the control valves 3 of the rail vehicle.

Furthermore, the electronic measurement unit also comprises a rechargeable battery 14 for autonomously supplying operating voltage, and therefore a current connection cable can be avoided for carrying out brake tests.

Communication with the portable control terminal 10, which is in the form of a PDA, is performed by the integrated radio interface 11a which is in the form of a wireless LAN interface. The portable control terminal 10 transmits control commands for executing a brake test by the electronic measurement unit 8 in the direction of the electronic measurement unit 8 and receives from the electronic measurement unit the measurement results which are obtained following the brake test for the purpose of displaying or for the purpose of storing the measurement results. In this case, the measurement results can be displayed by a graphic display 15, whereas values can be input in this case by an integrated keyboard 16 beneath the display 15.

Disclosed embodiments are not restricted to the above-described exemplary embodiment. Rather, modifications to the exemplary embodiment are also feasible, these modifications being also covered by the scope of protection of the following claims. For example, it is therefore also possible to use another suitable mobile control terminal instead of the PDA, provided that the mobile control terminal is equipped with a radio interface and suitable input and display means. Instead of accommodating the mobile electronic measurement unit in a housing which is designed in the manner of a wheeled case, it is also feasible to use a portable case or the like for this purpose, provided that the mobile unit may be transported by one person, to provide the advantage according to the disclosed embodiments of a high degree of mobility.

In the present application, the term radio interface also includes technologies such as Wi-Fi, Bluetooth and NFC. All control and evaluation operations can also be performed in the portable control terminal, for example in the case of pure radio sensors and actuators being used. Force measurement can also be performed in addition to or instead of pressure measurement. In this case, the current braking forces can be measured and evaluated by the force pick-up cell during the brake test. The force pick-up cells are used instead of the brake lining in this respect.

LIST OF REFERENCE SYMBOLS

1 Carriage
2 Traction vehicle
3 Control valve
4 Compressed-air container
5 Brake cylinder
6 Wheels
7 Compressor
8 Electronic measurement unit
9 Sensor
10 Portable control terminal
11 Radio interface
12 Microprocessor
13 Brake pressure control means
14 Rechargeable battery
15 Display
16 Keyboard

The invention claimed is:

1. A mobile measurement device for carrying out a brake test in a rail vehicle, having a pressure medium-operated brake system, the device comprising:
   pressure sensors, which are connected to measurement connections are accessible from the outside, are fitted; and
   a mobile electronic measurement unit being connected to the pressure sensors in the vicinity thereof and subjecting an electrical measurement signal from the pressure sensors to signal-processing, the mobile electronic measurement unit being equipped with an input that receives operator control and with a display for user dialog and also for displaying measurement results,
   wherein the input and the display of the electronic measurement unit are arranged in a portable control terminal, which is separate from the mobile electronic measurement unit, for remote control and also for outputting measurement results for storage,
   wherein the mobile electronic measurement unit and the portable control terminal communicate with one another in a bidirectional manner using a respectively associated radio interface or by connection cables, and
   wherein at least one pressure sensor of the pressure sensors detects the pressure in a main air line (HL), at least another pressure sensor of the pressure sensors detects an associated brake pressure, and at least one further pressure sensor of the pressure sensors detects one of the control pressures of a control valve and/or the feed pressure to the control valve along a time axis.

2. The mobile measurement device of claim 1, wherein the portable control terminal is a personal digital assistant (PDA) with a wireless LAN (WLAN) interface, the control function of the portable control terminal being implemented therein in a variable manner by control commands which are stored in software.

3. The mobile measurement device of claim 1, wherein the portable control terminal transmits control commands for the execution of a brake test by the electronic measurement unit in the direction of the electronic measurement unit.

4. The mobile measurement device of claim 1, wherein the portable control terminal receives the obtained measurement results for display and/or storage from the mobile electronic measurement unit.

5. The mobile measurement device of claim 1, wherein the pressure sensors detect a plurality of brake pressures and/or control pressures for each associated brake cylinder or control valves of the brake cylinders in parallel.

6. The mobile measurement device of claim 5, wherein the mobile electronic measurement unit further comprises an original electronic brake pressure control means of a rail vehicle for connection of the control valves to it.

7. The mobile measurement device claim 1, wherein the mobile electronic measurement unit further comprises a software-controlled microprocessor on which a measurement evaluation for implementing a UIC and/or AAR brake test is run.

8. The mobile measurement device claim 1, wherein the mobile electronic measurement unit further comprises a rechargeable battery for autonomous supply of operating voltage.

9. The mobile measurement device claim 1, wherein the mobile electronic measurement unit has a housing that is a wheeled case.

10. A method for testing brakes for a rail vehicle having a plurality of carriages, braking of wheels of the rail vehicle occurring as a result of control pressure in a main air line (HL) introduced by of a brake cylinder having associated control valves in each case, the method comprising: following introduction of control pressure, a brake test is performed by a mobile measurement device as recited in claim 1 when the rail vehicle is stationary.

11. The method of claim 10, wherein the pneumatic brake system for carrying out the brake test is connected to a compressed-air source.

\* \* \* \* \*